United States Patent [19]

Borkovitz

[11] 4,246,633
[45] Jan. 20, 1981

[54] VOLTAGE CONTROL CIRCUITRY FOR UPS

[75] Inventor: Henry S. Borkovitz, Skokie, Ill.

[73] Assignee: General Signal Corporation, Stamford, Conn.

[21] Appl. No.: 10,668

[22] Filed: Feb. 9, 1979

[51] Int. Cl.³ .................. H02P 13/20; H02M 5/44
[52] U.S. Cl. .................................. 363/37; 307/66; 363/95
[58] Field of Search ............ 307/66, 71, 46, 48, 307/60, 297, 359; 363/78, 79, 80, 96, 97, 37, 95; 361/18; 323/9

[56] References Cited

U.S. PATENT DOCUMENTS 3,805,139    4/1974    Hoffman .................. 307/66

Primary Examiner—L. T. Hix
Assistant Examiner—S. D. Schreyer
Attorney, Agent, or Firm—Milton E. Kleinman; John F. Ohlandt

[57] ABSTRACT

A voltage control circuit for an uninterruptible power supply (UPS), said UPS involving a controlled rectifier operating from an input AC line to charge batteries and to hold them at a constant voltage; the batteries supply power to an inverter which in turn produces an AC output, such output being uniquely controlled by efficiently and accurately compensating for any fluctuations due to battery voltage changes or to load changes.

9 Claims, 4 Drawing Figures

VOLTAGE CONTROL CIRCUITRY FOR UPS

BACKGROUND, OBJECTS AND SUMMARY OF THE INVENTION

The present invention pertains to control circuits and, more particularly, to voltage control circuitry for accurately controlling an output voltage in an uninterruptible power supply system regardless of input voltage and load variations.

In order to furnish background material for the subject matter of the present invention, reference may be made to U.S. Pat. No. 3,360,714 in which a voltage regulator device or circuit having open and closed loop compensating means is described. More particularly, the invention described in that patent involves a voltage regulator circuit in which the line or input voltage is selectively supplied to a pair of output terminals through an auto transformer in response to the controlled operation of a switching network associated with the auto transformer. Further, a control circuit therein is employed to selectively actuate the switching network so that either the average or root mean square value of the output voltage is maintained substantially constant.

Although the aforedescribed prior art voltage regulator circuit has its uses, it does not have the function of an uninterruptible power system; namely, that of supplying continuous power to a critical load during failure of the main power source.

In the case of systems that are designed to have an "uninterruptible power supply" or "UPS", certain basic components or elements are provided. One of these is a controlled rectifier/battery charger or similar means that is connected to the available AC utility lines and functions along with other components to charge a set of batteries so that in the event of power failure the batteries will constitute an emergency source. This is critically important in the case of computer installations or the like where information would be lost if power were to fail suddenly and no alternate source were available. Generally, the batteries referred to are held in a floating state by means of a controlled rectifier/battery charger; the batteries are connected or tied to an inverter which serves to generate an output AC voltage to be supplied to the load equipment such as the aforenoted computer or similar equipment.

A difficulty arises in connection with the aforenoted UPS systems when it is desired to control the output AC potential to as little as one-half percent variation in voltage or potential and to do so with an extremely fast response time.

Accordingly, it is a primary object of the present invention to provide control circuitry for an uninterruptible power supply and to do so with very fast response and extremely accurate voltage control.

Another object is to produce stability so as to avoid oscillations in the output of the unit or modulation of the AC output.

A further object is to provide control circuitry in which the voltage feedback means does not need to have a very high gain and for that reason is effective to achieve stability for the system.

Yet other objects are to compensate or correct for input voltage and load variations within a time interval corresponding to the period of one cycle of the applied input signal; and to achieve this with extremely low cost both with respect to construction and operation of the system.

Yet another object is to limit the inverter's output current to a predetermined upper limit.

In fulfillment of the above objects, a primary feature of the present invention resides in the provision of both a feed forward arrangement and a feed back arrangement in the control circuitry which operates upon the inverter means so as to produce rapid and accurate adjustment of its output voltage. More particularly, the feed forward arrangement includes DC input voltage control means, as well as AC output current control or compensating means; while the feed back arrangement includes both voltage and current feed back means within the control circuitry such that the voltage feedback per se can be provided with relatively low gain.

Other and further objects, advantages and features of the present invention will be understood by reference to the following specification in conjunction with the annexed drawing, wherein like parts have been given like numbers.

DESCRIPTION OF PREFERRED EMBODIMENT

The present invention is directed to the judicious application to an uninterruptible or emergency power supply system of a voltage control circuit or circuitry which is effective to quickly and accurately control and stabilize the output voltage by compensating for any significant variations that arise in the input DC voltage or in the load or output so that these variations do not cause undesired fluctuations, as they otherwise would, in the output voltage.

Figure 1:
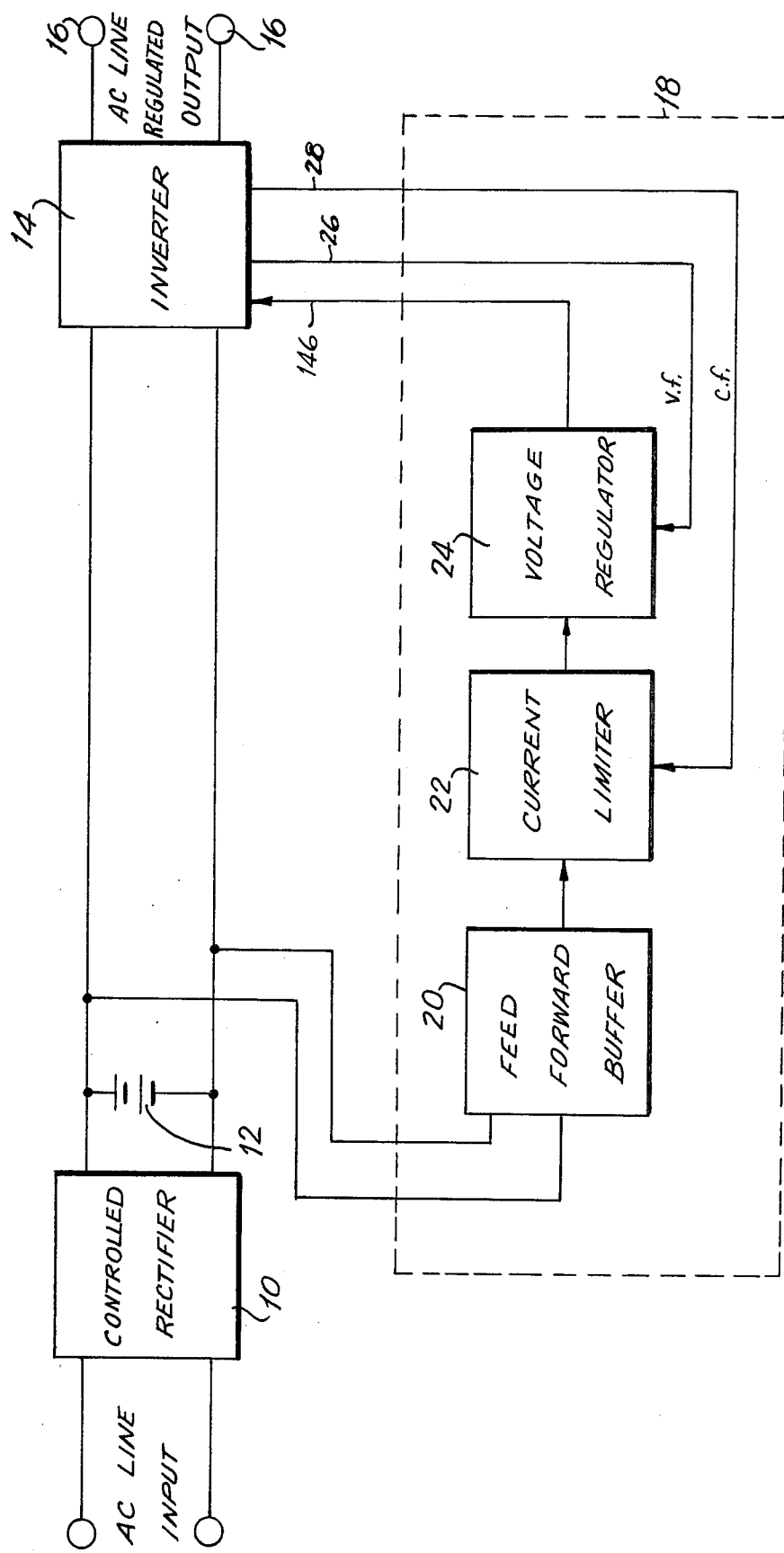
FIG. 1 is a simplified block diagram of the known uninterruptible power supply system and incorporated therewith the voltage control circuitry embodying the principal features of the present invention.

Accordingly, it will be seen by reference to FIG. 1 that a more or less conventional arrangement is illustrated in the upper part of that figure where an AC line input at the left is connected to a conventional controlled rectifier 10, which in turn has its output connected to a set of supply batteries 12 useful for providing an emergency source for computer equipment and the like. Various other components already mentioned, such as a required battery charger device, can be included as part of the controlled rectifier means 10. At the right in the upper part of the figure, there is also shown an inverter means 14 which is preferably a pulse width modulated inverter such as the type 26-60-32500-5100 manufactured by Sola Electric, a unit of General Signal Corporation. Such an inverter is available from the source indicated. The details of its construction are incorporated herein by reference. The inverter means 14 has its input connected across the set of batteries 12 and its line output at terminals 16 provides the required regulated AC output. The output voltage across these terminals is substantially constant, being held so precisely because of the presence of the control circuitry 18 of the present invention which operates to selectively control inverter means 14 in a manner to be described in detail hereinafter.

As illustrated in FIG. 1, the control circuitry 18 preferably includes a feed forward buffer means 20, which is connected across and senses the voltage from the battery supply 12. A current limiter means 22 has its input controlled by the operation of said feed forward buffer means 20 and it, in turn, controls a voltage regulator 24. The output of voltage regulator 24 feeds into the inverter 14 so as to establish control of the pulse width modulation of such device, thereby to effectuate control over and stabilize the AC output at terminals 16. Thus, adjustment of the phase or conduction angle of the inverter 14 serves to compensate for the input changes, i.e., any changes in battery voltage, and thereby acts to hold the output voltage constant from the feed forward standpoint. Accordingly, variations in the battery voltage are compensated by increasing the pulse width of the inverter as the battery voltage decreases and by decreasing the pulse width as the battery voltage increases.

In addition to this feed forward aspect just described, a feed back arrangement is also provided by way of the output lines 26 and 28 extending from inverter 14 to the voltage regulator 24 and current limiter 22, respectively. Such feed back arrangement will be described in detail hereinafter. Suffice to say here that voltage drops due to the variable load are compensated by increasing the pulse width of the inverter as the load increases; moreover, variations in output are corrected by varying the pulse width via conventional feed back means; however, only a low gain is required for such means because the above-described compensating circuits provide a good but only approximate control of the output voltage.

Figure 2:
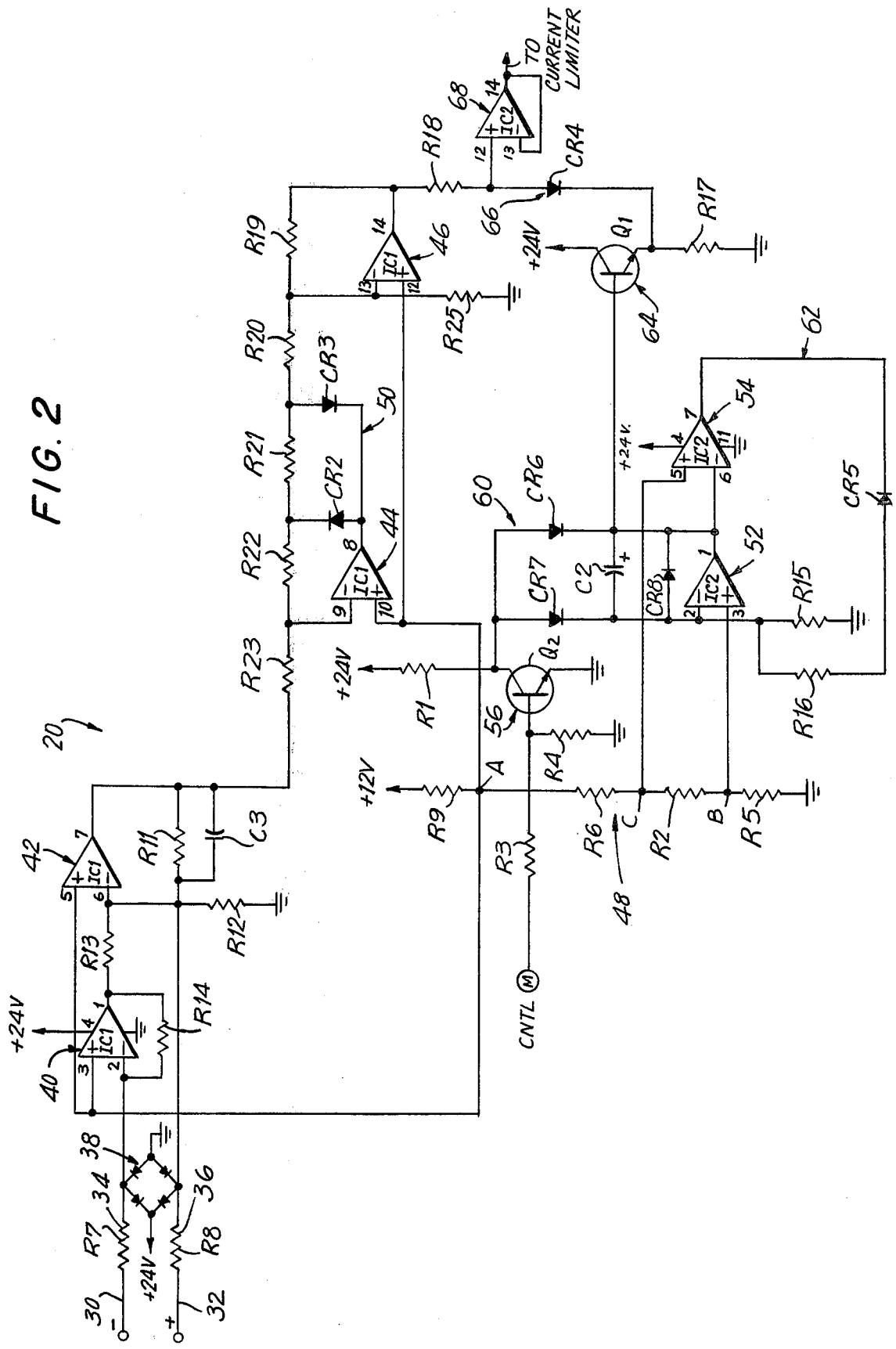
FIG. 2 is a schematic diagram of the feed forward buffer means utilized in the control circuitry.
Figure 3:
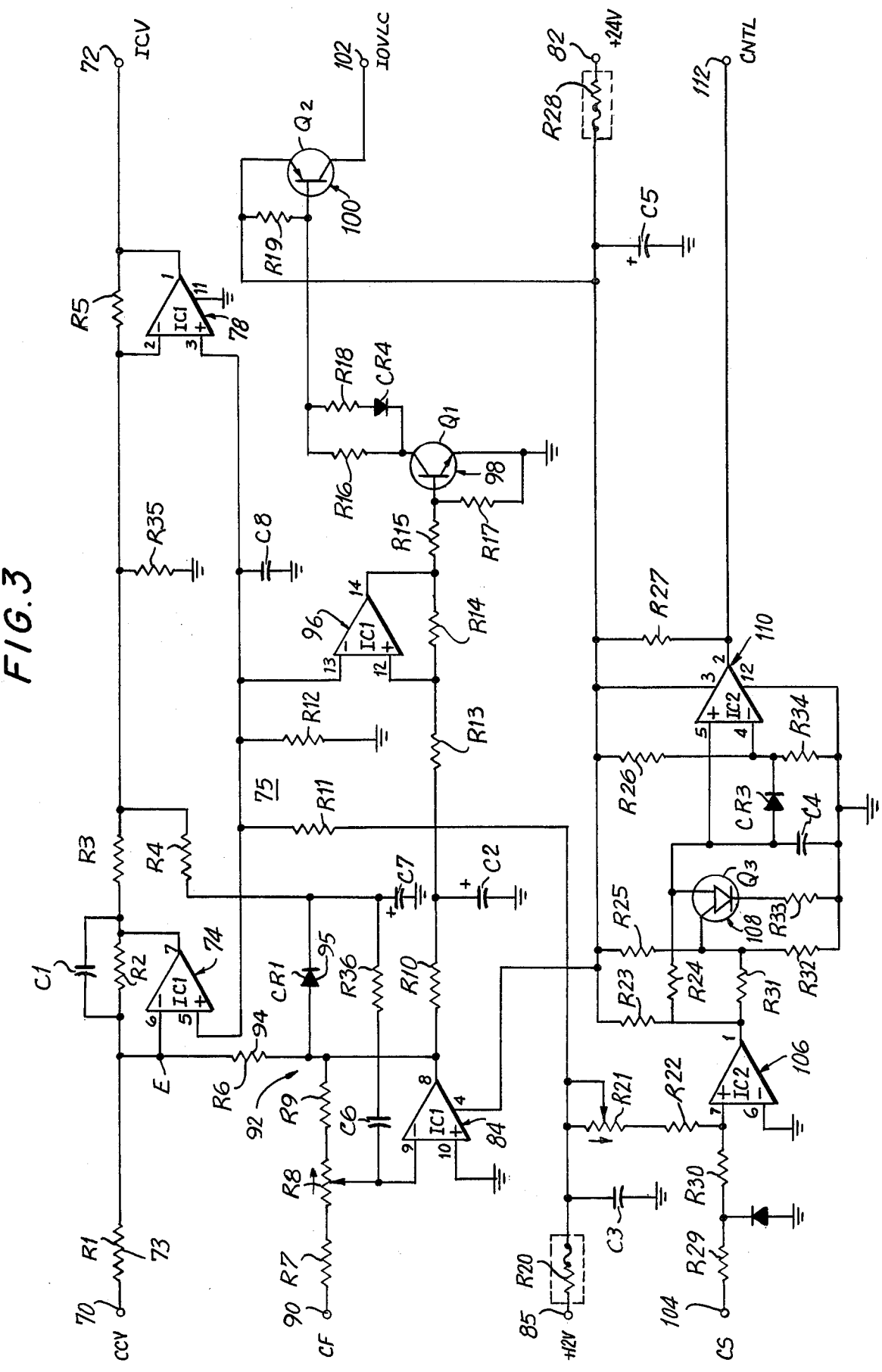
FIG. 3 is a schematic diagram of the current limiter means.
Figure 4:
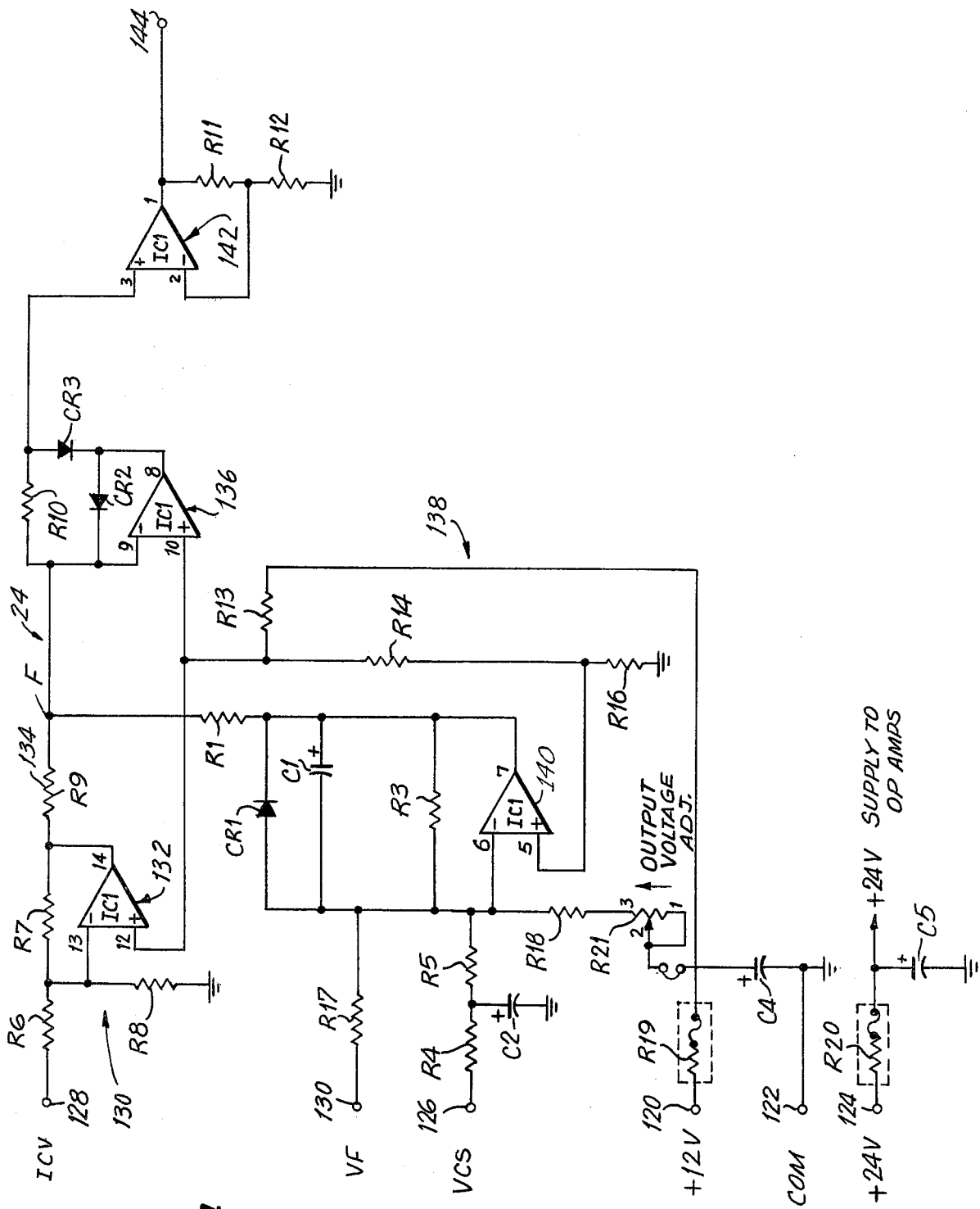
FIG. 4 is a schematic diagram of the voltage regulating means.

Referring to the other figures of the drawings, it will be seen that FIG. 2 schematically illustrates the more detailed features of the feed forward buffer means 20 already noted in connection with FIG. 1; FIG. 3 schematically illustrates the more detailed features of the current limiter means 22; and FIG. 4 illustrates in detail the voltage regulator 24.

In the specific embodiment of the feed forward buffer means illustrated in FIG. 2, there is seen at the upper left in the figure a pair of lines 30 and 32, the first of which is designated minus while the other is designated plus, thus indicating that these lines extend from the respective negative and positive sides of the battery set 12. Current limiting resistors 34 and 36 and a voltage limiting device 38 are connected in these lines which in turn extend to the negative inputs of a pair of inverting amplifiers 40 and 42, which are provided with appropriate input biasing networks, output networks and power supplies as called for in conventional selected arrangements. The particular operational amplifiers are integrated circuit types, and the type indicated, that is, an IC1, is an operational amplifier manufactured by National Semiconductor Corporation. Particular terminals for a desired circuit function are selected from a variety provided on such standardized integrated circuits, and such terminals have been labeled in the several figures with the manufacturer's terminal or pin numbers.

Similar comments also apply to the other operational amplifiers included in this buffer means, notably a further pair of amplifiers 44 and 46 arranged in an inverting mode. These amplifiers are also type IC1. It will be noted that the positive input terminals on these two amplifiers, that is, 44 and 46, as well as 40 and 42, are connected to point A on a voltage divider network 48 which has one end connected to +12 volts and the other end to ground. This second pair of operational amplifiers 44 and 46 are also appropriately provided with an input network, and a non-linear output network; in particular, a diode-resistor network 50 to achieve the desired non-linear response to changes in the battery voltage is connected to the output of amplifier 44. This non-linear network properly adjusts the conduction angle for changes in the battery voltage. It is designed to compensate for the non-linear relationship which exists between pulse width and voltage. Similar non-linear networks are used throughout the voltage control circuitry, in connection with other operational amplifiers, for the same essential purposes.

A further pair of operational amplifiers, similar to those already discussed, are seen in the lower part of the figure and these are designated 52 and 54. These likewise are appropriately provided with input voltages from the aforenoted voltage divider network 48 at points B and C, respectively. The negative input of amplifier 52 is connected to the output of an inverting transistor device 56 whose gate is seen connected to line 58 for purposes of enabling the circuit when in the UPS operating mode. The collector of inverting device 56 is connected to a 24 volt DC source.

Included between the output of inverter 56 and the respective inputs to operational amplifiers 52 and 54, is a diode-capacitor network 60 for generating a voltage ramp. Also it will be noted that the output of amplifier 52 is connected to input of amplifier 54 and a feedback arrangement is provided from the output of amplifier 54 back to the negative input of amplifier 52, such arrangement designated 62, functioning to change the ramp slope.

The output stage for the lower sub-circuit in FIG. 2 is in the form of a transistor device 64, specifically in an emitter follower configuration. The output from the emitter follower 64 is taken by way of diode 66 to a common node D, also connected to the output of amplifier 46, which in turn is connected to the plus input of an operational amplifier 68 which is configured in a voltage follower mode for impedance matching purposes to the next component, that is, to the current limiter means 22, which forms another principal part of the novel voltage control circuit.

Referring now to FIG. 3, the current limiter means 22 has an input line 70, seen at the upper left, and an output 72 which connects with voltage regulator 24, current limiting being effectuated so that the currents involved will not reach damaging proportions. To this end, input line 70 is connected by means of a suitable input resistor 73 to one of the inputs of an operational amplifier 74; specifically the minus input is used in this connection, and the plus input of operational amplifier 74 is connected to voltage divider network 75, which has one end at +12 volts and the other at ground. Likewise, another operational amplifier 78 has its plus input similarly connected, while its minus input is connected in cascade to the output of the first operational amplifier, that is, amplifier 74. As in the case of other sub-circuits already discussed, the requisite power supplies, such as plus 24 volts DC, are appropriately applied from terminal 82 seen at the lower right portion of FIG. 3. Power from the plus 12 volt supply at terminal 85 seen at the lower left is also applied where required, such as to operational amplifiers 74 and 78.

Operational amplifier 84 is included in another control circuit which functions as part of a current feedback arrangement. Thus it will be understood that the control line designated CF in FIG. 1 extends from the inverter 14 and the output current control signal thereon is fed by way of terminal 90 in FIG. 2 to the minus input of operational amplifier 84, which is suitably provided with an input-output network 92, its output being fed by way of resistor 94 to a common node E which is connected to the minus input of operational amplifier 74.

When the output current control signal exceeds a pre-set level (about 120% of rated), the current limiting circuit reduces the pulse width and hence the output voltage. This reduces the output current and limits it to just above the pre-set level. Otherwise, that is for values of load current up to the fixed limit, or 120% of rated, the inverter's output current tends to increase the output voltage to compensate for internal voltage drops. This results because an alternate path, which eliminates the inversion function provided by amplifier 74, is established when diode 95, in the output of amplifier 84, is caused to conduct as the pre-set limit on load current is exceeded. Consequently, the opposite effect is brought about, that is, a reduction in inverter output voltage from the case when the pre-set limit has not been reached and the inversion due to amplifier 74 is operative.

Further amplifiers are provided in the form of operational amplifier 96 and transistor amplifiers 98 and 100, the output from terminal 102, connected to transistor 100, being designed for the purpose of driving an indicator lamp and relay. A further control sub-circuit, included as part of the current limiter means, is seen, at the lower left portion of FIG. 3, to have an input terminal 104. The purpose of this sub-circuit is to sense inverter peak current. Included in this sub-circuit is an operational amplifier 106, a programmable unijunction transistor 108, and a further operational amplifier 110, the output of the last-named being connected to terminal 112 for the purpose of shutting down the inverter if the inverter output current exceeds a maximum limit.

Referring now to FIG. 4, the schematic diagram indicates the detailed layout of the voltage regulator 24 previously noted in FIG. 1. At the lower left corner there are indicated certain common features; that is, features in common with the other schematic diagrams, such as the +12 volts DC terminal, for example, which is here designated 120; below that a common or ground terminal 122, as well as terminal 124 which is connected to the 24 volt DC supply, that supply being then suitably filtered to provide the requisite voltage to the operational amplifiers involved in the circuit.

It will be noted that a terminal 126 seen immediately above terminal 120 is labeled VCS and this serves for the function of providing connections to a remote voltage adjustment potentiometer. In addition, a terminal designated 130, also labeled VF, connects with the voltage feedback line 26 extending from the output of inverter 14.

The line or terminal 128 is connected by means of a suitable input network 130 to the minus input of an operational amplifier 132 whose output is in turn connected by way of resistor 134 to the minus input of another operational amplifier 136. The plus inputs of both of these operational amplifiers, that is, 132 and 136, are connected to a voltage divider network 138 which in turn is connected to the 12 volt DC supply from terminal 120.

Another operational amplifier 140 has its minus input connected to the aforenoted terminal 126, and its plus terminal is connected to the network 138. The minus input of operational amplifier 140 is also connected to terminal 130, already referred to, which is the voltage feedback terminal. Yet another operational amplifier 142 is seen as the final stage of the voltage regulator means, its output being taken to output terminal 144. That output terminal is, of course, connected to control line 146 in FIG. 1, such control line being effective to control the pulse width modulation of inverter 14 and thereby to produce sufficient change in the output from inverter 14 to compensate for any fluctuation sensed or monitored across the battery supply 12. Consequently, a well regulated AC voltage appears across the terminals 16.

Substantially the same kind of control is also effectuated, but operative in response to output changes in accordance with the feature already discussed briefly, by having current responsive and voltage responsive feedback from the output of inverter 14 to the current limiter 22 and voltage regulator 24, respectively. Referring to FIG. 4, it will be appreciated that when a voltage change is sensed at the output of inverter 14, due to a sudden change in load or the like, an appropriate control signal received at terminal 130 is applied by way of operational amplifier 140 to node F, at the top of FIG. 4, which is fed to the minus input of operational amplifier 136. Accordingly, an appropriate signal is generated at the output of operational amplifier 136, and consequently at the output of the amplifier 142, to produce a sufficient output signal at terminal 144 so as, again, to feed an appropriate control signal, which will be denominated a second control signal, by way of line 146 to inverter 14.

Similarly, a current responsive feedback signal responsive to fluctuations at the inverter output is fed by way of the line 28, also designated current feedback (C.F.) to the terminal 90 seen in FIG. 3, and thence to the node E connected to the negative input of operational amplifier 74. Consequently, a control signal is developed at the output of the current limiter, that is to say, at the terminal 72, which in turn feeds a sufficient signal to the operational amplifier 132 of the voltage regulator to develop another appropriate, or second control signal, on control line 146.

What has been described is an improvement for use with an emergency or uninterruptible power supply system involving a voltage control means connected to control the output voltage of an inverter in response to variations in (1) the voltage across a set of batteries or (2) in response to a signal proportional to the inverter's output current and (3) to a signal proportional to the inverter's output voltage. Although the preferred embodiment has been described with reference to a scheme that includes control of the pulse width modulation of the inverter, it will be appreciated that the improvement can include an arrangement whereby two inverters are operated at the same frequency but a means is provided for controlling the phase angle between them so as to control the output voltage.

In order to furnish the man skilled in the art with a somewhat detailed set of specifications for practicing the preferred embodiment of the present invention, the following types and values of components for the several parts of the system are herewith included.

FEED FORWARD BUFFER (FIG. 2)

Resistors

| | | |
|---|---|---|
| R1 ... 6.2K | R9 ... 3.16K | R18 ... 2.7K |
| R2 ... 1.91K | R11 ... 78.7K | R19 ... 19.60K |
| R3 ... 47K | R12 ... 16.5K | R20 ... 21.5K |
| R4 ... 10K | R13, R14 ... 6.98K | R21 ... 19.6K |
| R5 ... 4.12K | R15 ... 470K | R22 ... 24.9K |
| R6 ... .768K | R16 ... 180K | R23 ... 75K |
| R7, R8 .. 31.6K | R17 ... 1K | R25 ... 43.2K |

Transistors
Q1, Q2 ... 2N2222

Capacitors
C2 ... 1.8 MF 35 v.
C3 ... 1 UF 50 v.

Diodes
CR2, CR3, CR4, CR5, CR6, CR7 ... 1N4148
CR8 ... 1N47408

CURRENT LIMITER (FIG. 3)

Resistors

| | |
|---|---|
| R1, R7 .. 22.1K | R12 ... 14K |
| R2, R3, R5, R36 .. 22.1K | R14, R24 .. 1M |
| R4 ... 7.5K | R10, R15, R27 .. 10K |
| R8 ... 20K | R13, R17, R19, R26, R34 .. 1K |
| R9 ... 52.3K | R16, R18 ... 1.5K |
| R6 ... 200K | R20, R28 ... 2 ohm, 2W |
| R11 ... 2K | R21 ... 20K |
| R22 ... 7.5K | R23 ... 4.7K |
| R25, R32, R33 .. 22K | R29 ... 16K |
| R30 ... 330 ohms | R31 ... 39K |
| R35 ... 200K | |

Transistors
Q1 ... 2N2222A    Q2 ... 2N5322    Q3 ... 2N6111X

Capacitors
C1, C4, C6, C8 ... 22MF 50 v.
C2 ... 1.8MFD 20 v.
C3, C5 ... 47MF 20 v.
C7 ... 6.8MF 35 v.

Diodes
CR1, CR2, CR3 ... 1N4148
CR4 ... LED

VOLTAGE REGULATOR (FIG. 4)

Resistors

| | |
|---|---|
| R1 ... 150K | R13 ... 12.4K |
| R3 ... 680K | R14 ... 7.50K |
| R4, R5 ... 39K | R16 ... 20K |
| R6, R11 ... 10K | R17 ... 22.1K |
| R7 ... 6.04K | R18 ... 4.64K |
| R8, R12 ... 15K | R19, R20 ... 2 ohm 2W |
| R9, R10 ... 22.1K | R21 ... 2K |

Capacitors
C1, C2 ... 1.8 UF 35 v.    C4, C5 ... 47 MF 20 v.

Diodes
CR1, CR2, CR3 ... 1N4148

---

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In an emergency or uninterruptible power supply system, which system includes input and output terminals, a controlled rectifier for receiving an AC input and for providing a DC output, a set of batteries connected to the output of said controlled rectifier, and an inverting means having an input connected across said set of batteries, the improvement which comprises:

a voltage control means connected to control the magnitude of the output voltage of said inverting means, by compensating for variations arising in the input voltage or in the output so that these variations do not cause undesired fluctuations in the output voltage, including feed forward means, having its input directly connected to said set of batteries and its output connected to said inverting means, for responding to variations in the magnitude of the voltage across said set of batteries so as to control said inverting means and prevent said undesired fluctuations in the output voltage, feedback means for responding to a signal proportional to the inverter's output current, and feedback means for responding to a signal proportional to the inverter's output voltage.

2. A power supply system as defined in claim 1, in which the means for responding to a signal proportional to the inverter's output current tends to increase the output voltage so as to compensate for internal voltage drops for values of load current up to a fixed limit, and for values thereabove reduces the output voltage so as to limit the load current.

3. A power supply system as defined in claim 2, in which said current limiting means includes first and second operational amplifiers, a feedback connection between said inverting means and an input of the first of said operational amplifiers, the output of the first of said amplifiers being connected to an input of the second; and a further means at the output of said first operational amplifier for providing an alternate conduction path around said second operational amplifier when the value of the load current exceeds a fixed limit, whereby an opposite effect on the output voltage of the inverting means is achieved from the case where said alternate path is non-conducting.

4. A power supply system as defined in claim 1 or 2, in which said means for responding to a signal proportional to the inverter's output voltage includes pulse width modulating control means for altering the magnitude of AC output voltage of said inverting means.

5. A power supply system as defined in claim 1, including a plurality of operational amplifiers connected between the input and output of said voltage control means, and non-linear biasing networks connected to certain ones of said operational amplifiers for compensating for the non-linear relationship between pulse width and the output voltage from said inverting means.

6. In an emergency or uninterruptible power supply system, which system includes input and output terminals, a controlled rectifier for receiving an AC input and for providing a DC output, a set of emergency batteries connected to the output of said controlled rectifier, and an inverting means having an input connected across said set of batteries, the improvement which comprises:

a voltage control circuit connected to sense or monitor variations in the DC voltage across said set of batteries and to sense or monitor variations in the output from said inverter means responsive to load changes, said voltage control circuitry including:

(a) a feed forward buffer means connected at its input to said set of batteries, (b) a current limiting means for receiving input control signals from said feed forward buffer means which respond to the DC voltage variation across said batteries, (c) a voltage regulator for receiving control signals from said current limiter means and for supplying first output control signals to said inverting means, (d) a feedback means for feeding input control signals which are responsive to load changes so as to supply second output control signals to said inverting means, including a voltage feedback means connected from an output of said inverting means to said voltage regulator, and a further current feedback means connected from an output of said inverter to said current limiter means.

7. In a power supply system as defined in claim 6, further including pulse width modulating control means for controlling said inverting means so as to alter the AC output voltage therefrom responsive and proportional to fluctuations sensed in response to DC input voltage changes or to load changes so as to correct or compensate for such changes and provide a substantially constant voltage at said output terminals.

8. A power supply system as defined in claim 6, in which said current limiting means includes first and second operational amplifiers, a feedback connection between said inverting means and an input of the first of said operational amplifiers, the output of the first of said amplifiers being connected to an input of the second; and a further means at the output of said first operational amplifier for providing an alternate conduction path around said second operational amplifier when the value of the load current exceeds a fixed limit, whereby an opposite effect on the output voltage of the inverting means is achieved from the case where said alternate path is non-conducting.

9. A power supply system as defined in claim 6, including a pluraity of operational amplifiers connected between the input and output of said voltage control means, and non-linear biasing networks connected to certain ones of said operational amplifiers for compensating for the non-linear relationship between pulse width and the output voltage from said inverting means.

* * * * *